United States Patent
Ohira et al.

(10) Patent No.: US 12,292,656 B2
(45) Date of Patent: May 6, 2025

(54) ELECTRO-OPTICAL DEVICE, ELECTRO-OPTICAL UNIT, AND DISPLAY DEVICE

(71) Applicant: Japan Display Inc., Tokyo (JP)

(72) Inventors: Hirofumi Ohira, Tokyo (JP); Koji Yoshida, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/416,396

(22) Filed: Jan. 18, 2024

(65) Prior Publication Data
US 2024/0255812 A1 Aug. 1, 2024

(30) Foreign Application Priority Data

Jan. 26, 2023 (JP) ................................. 2023-010519

(51) Int. Cl.
G02F 1/1343 (2006.01)
G02F 1/1333 (2006.01)

(52) U.S. Cl.
CPC .. G02F 1/134309 (2013.01); G02F 1/133391 (2021.01); *G09G 2300/023* (2013.01)

(58) Field of Classification Search
CPC ........ G02F 1/134309; G02F 1/133391; G09G 2300/023
See application file for complete search history.

(56) References Cited

U.S. PATENT DOCUMENTS

| | | | |
|---|---|---|---|
| 2008/0058896 A1* | 3/2008 | Terasawa | A61N 1/36046 607/54 |
| 2021/0333580 A1 | 10/2021 | Matsushima | |
| 2023/0079179 A1 | 3/2023 | Matsushima | |
| 2023/0324730 A1 | 10/2023 | Matsushima | |

FOREIGN PATENT DOCUMENTS

JP 2021-173938 A 11/2021

OTHER PUBLICATIONS

Machines translation of Cn 110308596B (Year: 2019).*

* cited by examiner

*Primary Examiner* — Lucy P Chien
(74) *Attorney, Agent, or Firm* — K&L Gates LLP

(57) ABSTRACT

According to an aspect, an electro-optical device includes: a first substrate; a first electrode disposed on the first substrate; a second substrate disposed facing the first substrate; a second electrode disposed on the second substrate and facing the first electrode; and a liquid crystal layer provided between the first electrode and the second electrode. The second electrode includes a plurality of divided electrodes arranged in a first direction. Two divided electrodes adjacent to each other among the divided electrodes are disposed with a slit interposed between the two divided electrodes.

9 Claims, 7 Drawing Sheets

FIG.1
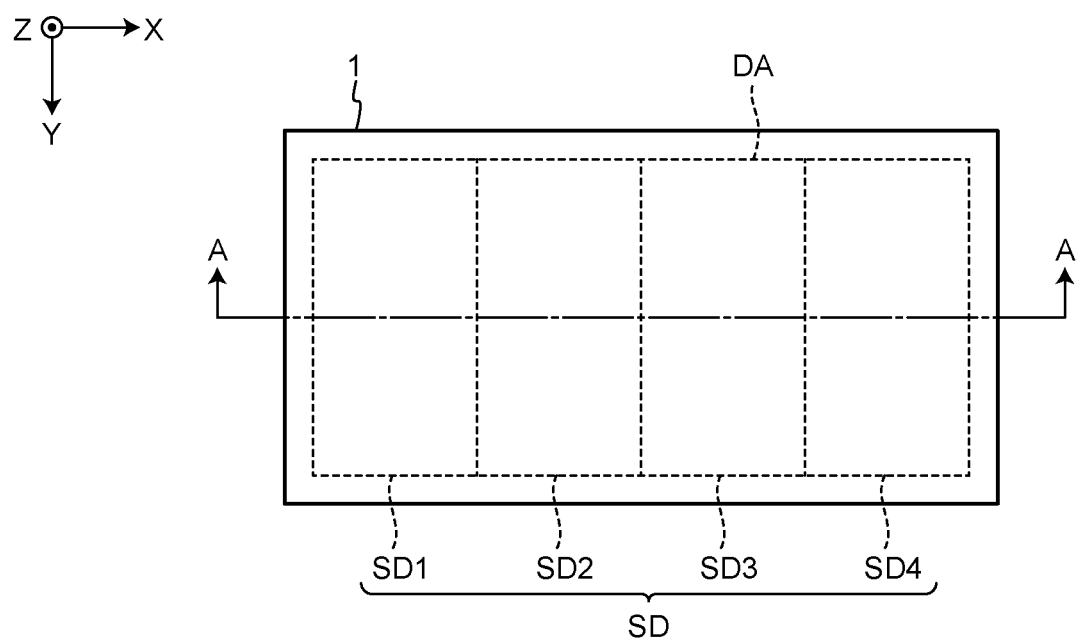

ELECTRO-OPTICAL DEVICE, ELECTRO-OPTICAL UNIT, AND DISPLAY DEVICE

CROSS-REFERENCE TO RELATED APPLICATION

This application claims the benefit of priority from Japanese Patent Application No. 2023-010519 filed on Jan. 26, 2023, the entire contents of which are incorporated herein by reference.

BACKGROUND

1. Technical Field

What is disclosed herein relates to an electro-optical device, an electro-optical unit, and a display device.

2. Description of the Related Art

Japanese Patent Application Laid-open Publication No. 2021-173938 (JP-A-2021-173938) discloses a view angle control display device including twisted nematic elements (liquid crystal molecules) and a view angle control element (example of an electro-optical device) configured to control the view angle of a display surface. The view angle control display device is mounted on, for example, a vehicle. The view angle control element controls the view angle of the display surface so that, for example, an image displayed on the display surface cannot be visually recognized by a person on the driver seat but can be visually recognized by a person on the front passenger seat.

The view angle control element of JP-A-2021-173938 is made of only one pair of electrodes, and the view angle is uniformly controlled across the entire display surface. Thus, the view angle on the driver seat side in the horizontal direction is maintained substantially constant across the entire display surface when controlling so that the image is not visible to a person on the driver seat.

As the length of the display surface of a display device in the horizontal direction increases, the sight angle of a person with respect to the display surface in the horizontal direction increases. In this case, when controlling so that an image is not visible to a person on the driver seat, the image displayed on the driver seat side on the display surface is potentially visually recognized by the person on the driver seat if the view angle on the driver seat side in the horizontal direction is substantially constant across the entire display surface as in the above-described view angle control display device.

For the foregoing reasons, there is a need for an electro-optical device capable of appropriately controlling the view angle.

SUMMARY

According to an aspect, an electro-optical device includes: a first substrate; a first electrode disposed on the first substrate; a second substrate disposed facing the first substrate; a second electrode disposed on the second substrate and facing the first electrode; and a liquid crystal layer provided between the first electrode and the second electrode. The second electrode includes a plurality of divided electrodes arranged in a first direction. Two divided electrodes adjacent to each other among the divided electrodes are disposed with a slit interposed between the two divided electrodes.

According to an aspect, an electro-optical unit includes two of the electro-optical devices. Two first divided electrodes adjacent to each other among a plurality of first divided electrodes included in a first electro-optical device of the two electro-optical devices are disposed with a first slit interposed between the two first divided electrodes. Two second divided electrodes adjacent to each other among a plurality of second divided electrodes included in a second electro-optical device of the two electro-optical devices overlap the two first divided electrodes in a plan view and are disposed with a second slit interposed between the two second divided electrodes. The second slit overlaps the first slit in a plan view.

According to another aspect, an electro-optical unit comprising two of the electro-optical devices. Two first divided electrodes adjacent to each other among a plurality of first divided electrodes included in a first electro-optical device of the two electro-optical devices are disposed with a first slit interposed between the two first divided electrodes. Two second divided electrodes adjacent to each other among a plurality of second divided electrodes included in a second electro-optical device of the two electro-optical devices overlap the two first divided electrodes in a plan view and are disposed with a second slit interposed between the two second divided electrodes. The second electro-optical device is disposed on a back surface side of the first electro-optical device. The second slit is positioned on a first side of the first slit in the first direction in a plan view.

According to an aspect, a display device includes the electro-optical device and a display panel having a display region. The electro-optical device entirely overlaps the display region in a plan view.

BRIEF DESCRIPTION OF THE DRAWINGS

FIG. 1 is a plan view of a display device according to a first embodiment;

DETAILED DESCRIPTION

Figure 2:
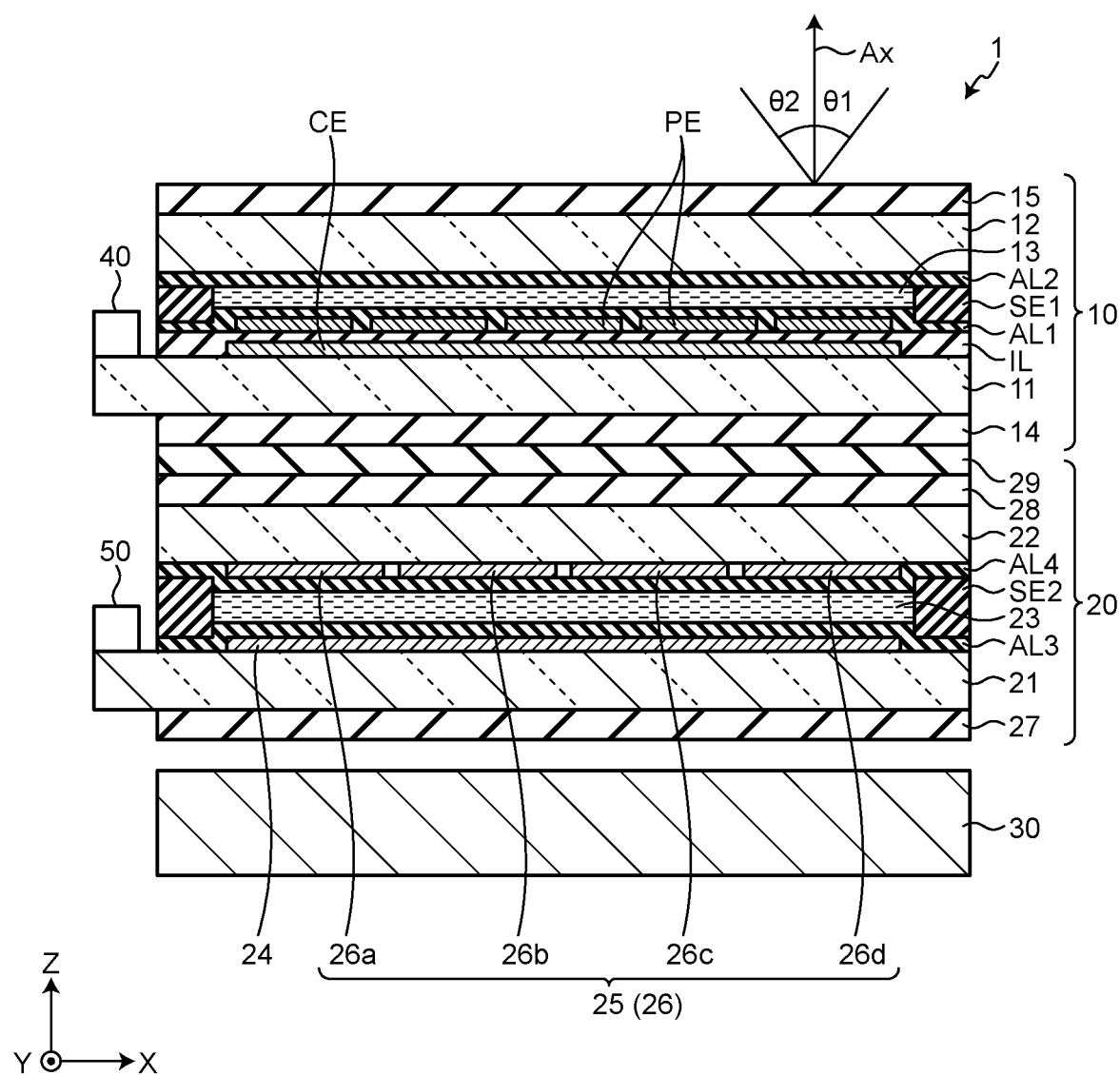
FIG. 2 is a sectional view of the display device along line A-A illustrated in FIG. 1.

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is only an example, and any modifications that can be easily conceived by those skilled in the art while maintaining the main purpose of the disclosure are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

An X direction and a Y direction illustrated in the drawings correspond to directions orthogonal to each other and parallel to a principal surface (for example, front surface) of a substrate included in a display device 1. A positive X side and a negative X side in the X direction and a positive Y side and a negative Y side in the Y direction correspond to sides of the display device 1. A Z direction corresponds to a direction orthogonal to a principal surface of the substrate included in the display device 1, a positive Z side in the Z direction corresponds to a front surface side on which an image is displayed in the display device 1, and a negative Z side in the Z direction corresponds to a back surface side of the display device 1. In the present specification, a "plan view" is a view of the display device 1 in the Z direction from one of the positive Z side and the negative Z side. The X direction corresponds to a "first direction", the negative X side in the X direction corresponds to a "first side in the first direction", and the positive X side in the X direction corresponds to a "second side in the first direction". The X, Y, and Z directions are exemplary and the present disclosure is not limited to these directions.

In this disclosure, when an element is described as being "on" another element, the element can be directly on the other element, or there can be one or more elements between the element and the other element.

First Embodiment

FIG. 1 is a plan view of the display device 1 according to a first embodiment. In the first embodiment, the display device 1 is installed in, for example, a vehicle and attached at a position where a person M1 on the driver seat and a person M2 on the front passenger seat can visually recognize the front surface of the display device 1. The person M1 on the driver seat is positioned on the negative X side of the display device 1. The person M2 on the front passenger seat is positioned at a position overlapping the display device 1 in the Z direction, specifically, in front of the display device 1.

A rectangular display region DA in which an image is displayed is provided at the front surface of the display device 1. The display region DA is partitioned into a plurality of sub display regions SD in rectangular shapes identical to one another. The number of the sub display regions SD is four, and a first sub display region SD1, a second sub display region SD2, a third sub display region SD3, and a fourth sub display region SD4 are arranged in the stated order from the negative X side toward the positive X side in the X direction.

Images different from one another may be displayed in the sub display regions SD, or one image may be displayed in at least two sub display regions SD adjacent to each other. The sub display regions SD are not limited to rectangular shapes, and the number of sub display regions SD is not limited to four.

FIG. 2 is a sectional view of the display device 1 along line A-A illustrated in FIG. 1. The display device 1 includes a display panel 10, a view angle control panel 20 that is an electro-optical device, and a backlight unit 30. The display panel 10, the view angle control panel 20, and the backlight unit 30 are disposed in the stated order from the positive Z side toward the negative Z side. The display panel 10 and the view angle control panel 20 are bonded to each other.

The display panel 10 is a transmissive liquid crystal display of a horizontal electric field system (for example, a fringe field switching (FFS) system). The display panel 10 may be driven by an IPS system other than the FFS system or by a vertical electric field system such as a twisted nematic (TN) system or a vertical alignment (VA) system.

The display panel 10 includes a first display substrate 11, a second display substrate 12 disposed facing the first display substrate 11, and a display liquid crystal layer 13 between the first display substrate 11 and the second display substrate 12.

The first display substrate 11 is positioned on the back surface side of the second display substrate 12. An alignment film AL1, an insulating film IL, a common electrode CE, and a plurality of pixel electrodes PE are disposed on the front surface side of the first display substrate 11. The alignment film AL1 contacts the display liquid crystal layer 13.

The common electrode CE is provided between the first display substrate 11 and the insulating film IL. The pixel electrodes PE are provided between the insulating film IL and the alignment film AL1.

The pixel electrodes PE overlap the display region DA, in which an image is displayed on the display panel 10, in a plan view. The pixel electrodes PE also overlap the one common electrode CE in a plan view with the insulating film IL interposed therebetween. The pixel electrodes PE and the common electrode CE apply a voltage to the display liquid crystal layer 13.

An alignment film AL2 is disposed on the back surface side of the second display substrate 12. The alignment film AL2 contacts the display liquid crystal layer 13.

The display panel 10 further includes a seal SE1 that seals liquid crystal molecules in the display liquid crystal layer 13. The display panel 10 also includes a first polarization plate 14 and a second polarization plate 15. The first polarization plate 14 is disposed on the back surface side of the first display substrate 11. The second polarization plate 15 is disposed on the front surface side of the second display substrate 12.

The front surface of the second polarization plate 15 corresponds to the front surface of the display device 1. The transmission axis of the first polarization plate 14 and the transmission axis of the second polarization plate 15 are orthogonal to the Z direction. The transmission axis of the first polarization plate 14 and the transmission axis of the second polarization plate 15 are orthogonal to each other.

Only a main part of the display panel 10 is illustrated in a simplified manner in FIG. 2, and the display panel 10 also includes non-illustrated members. The second display substrate 12 includes, for example, a light-shielding layer, a color filter layer, an overcoat layer, and a spacer. The first display substrate 11 includes, for example, a plurality of scanning lines, a plurality of signal lines, switching elements electrically coupled to the respective pixel electrodes PE, and various insulating films.

Figure 3:
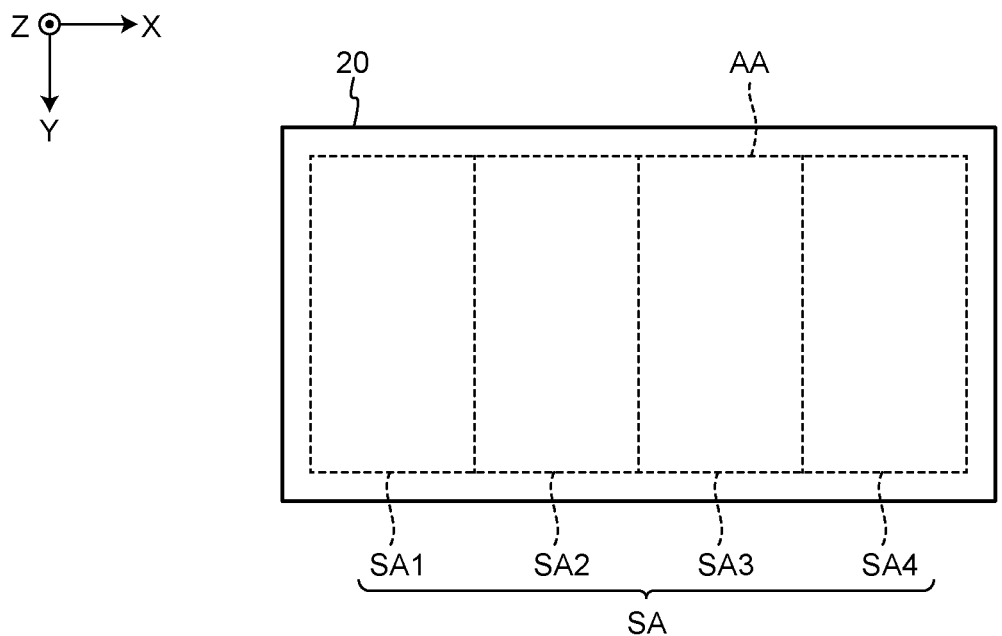
FIG. 3 is a plan view of a view angle control panel.

FIG. 3 is a plan view of the view angle control panel 20. The view angle control panel 20 adjusts, in an effective region AA, the view angle of the display region DA in the X direction. The effective region AA overlaps the display region DA in a plan view. The effective region AA is partitioned into a plurality of sub effective regions SA corresponding to the sub display regions SD.

The number of sub effective regions SA is equal to the number of sub display regions SD. Specifically, the number of sub effective regions SA is four, and the effective region AA is partitioned into a plurality of sub effective regions: a first sub effective region SA1 overlapping the first sub display region SD1 in a plan view, a second sub effective region SA2 overlapping the second sub display region SD2 in a plan view, a third sub effective region SA3 overlapping the third sub display region SD3 in a plan view, and a fourth sub effective region SA4 overlapping the fourth sub display region SD4 in a plan view.

The view angle is an angle with which an image displayed in the display region DA can be visually recognized by the persons M1 and M2. As illustrated in FIG. 2, the view angle is an X-directional view angle and expressed by using an X-directional tilt angle indicating a tilt in the X direction with respect to a reference axis Ax in a direction (parallel to the Z direction in the present embodiment) orthogonal to a principal surface (for example, the front surface) of a substrate to be described later, which is included in the view angle control panel 20, with a reference point as an optional point in the display region DA. Hereinafter, a view angle expressed by a tilt angle on the positive X side with respect to the reference axis Ax is referred to as a positive X side view angle θ1, and a view angle expressed by a tilt angle on the negative X side with respect to the reference axis Ax is referred to as a negative X side view angle θ2.

In the present embodiment, the view angle control panel 20 switches between a view angle with which an image displayed in the display region DA can be visually recognized by both the person M1 on the driver seat and the person M2 on the front passenger seat and a view angle with which the image cannot be visually recognized by the person M1 on the driver seat but can be recognized by the person M2 on the front passenger seat (to be described later in detail).

The view angle control panel 20 is a liquid crystal panel of a vertical electric field system (for example, the TN system). The view angle control panel 20 entirely overlaps the display region DA in a plan view. The view angle control panel 20 includes a first control board 21, a second control board 22 disposed facing the first control board 21, and a control liquid crystal layer 23 positioned between the first control board 21 and the second control board 22.

The first control board 21 is positioned on the back surface side of the second control board 22. An alignment film AL3 and a first electrode 24 are disposed on the front surface side of the first control board 21. The alignment film AL3 contacts the control liquid crystal layer 23. The first electrode 24 has a single-sheet shape and is disposed between the first control board 21 and the alignment film AL3. The first electrode 24 overlaps the effective region AA in a plan view.

An alignment film AL4 and a second electrode 25 are disposed on the back surface side of the second control board 22. The alignment film AL4 contacts the control liquid crystal layer 23.

The second electrode 25 is disposed between the second control board 22 and the alignment film AL4. The second electrode 25 is disposed facing the first electrode 24. The second electrode 25 overlaps the effective region AA in a plan view. The second electrode 25 is partitioned into a plurality of divided electrodes 26.

Figure 4:
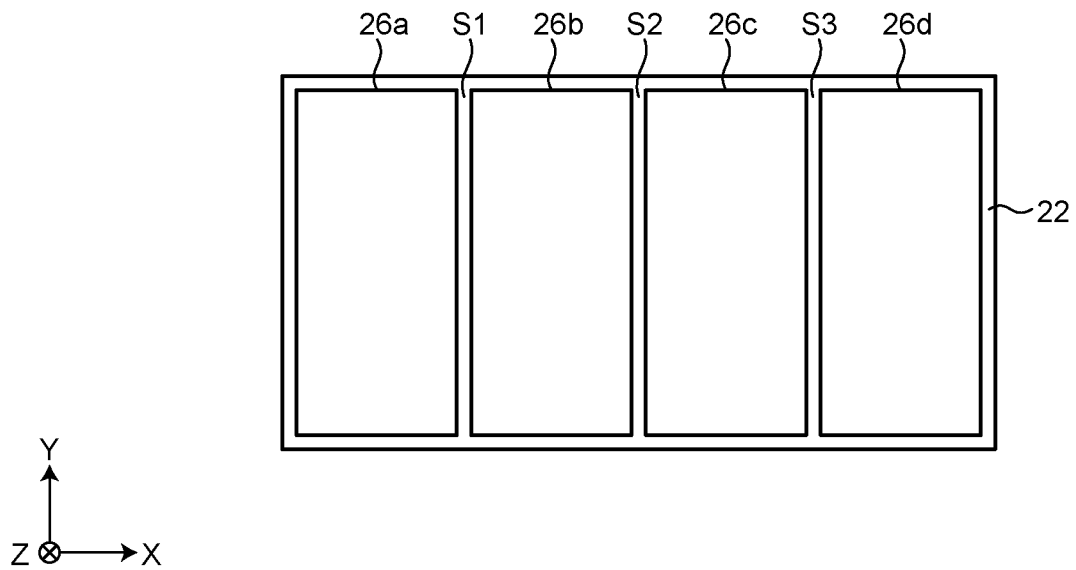
FIG. 4 is a plan view of a second control board.

FIG. 4 is a plan view of the second control board 22. The alignment film AL4 is not illustrated in FIG. 4. The number of the divided electrodes 26 is equal to the number of the sub effective regions SA. Specifically, the number of the divided electrodes 26 is four, and a first divided electrode 26a, a second divided electrode 26b, a third divided electrode 26c, and a fourth divided electrode 26d are arranged in the stated order from the negative X side toward the positive X side in the X direction. The first divided electrode 26a, the second divided electrode 26b, the third divided electrode 26c, and the fourth divided electrode 26d have single-sheet shapes identical to one another and rectangular shapes in a plan view.

The first divided electrode 26a overlaps the first sub effective region SA1 and the first sub display region SD1 (FIG. 1) in a plan view. The second divided electrode 26b overlaps the second sub effective region SA2 and the second sub display region SD2 in a plan view. The third divided electrode 26c overlaps the third sub effective region SA3 and the third sub display region SD3 in a plan view. The fourth divided electrode 26d overlaps the fourth sub effective region SA4 and the fourth sub display region SD4 in a plan view. The first divided electrode 26a, the second divided electrode 26b, the third divided electrode 26c, and the fourth divided electrode 26d are simply referred to as the "divided electrodes 26" when described without distinction.

Two divided electrodes 26 adjacent to each other are disposed with a slit S interposed therebetween, the slit S extending in the Y direction. Specifically, the first divided electrode 26a and the second divided electrode 26b are disposed with a first slit S1 interposed therebetween. The second divided electrode 26b and the third divided electrode 26c are disposed with a second slit S2 interposed therebetween. The third divided electrode 26c and the fourth divided electrode 26d are disposed with a third slit S3 interposed therebetween.

The first slit S1 overlaps the boundary line between the first sub effective region SA1 and the second sub effective region SA2 and the boundary line between the first sub display region SD1 and the second sub display region SD2 in a plan view. The second slit S2 overlaps the boundary line between the second sub effective region SA2 and the third sub effective region SA3 and the boundary line between the second sub display region SD2 and the third sub display region SD3 in a plan view. The third slit S3 overlaps the boundary line between the third sub effective region SA3 and the fourth sub effective region SA4 and the boundary line between the third sub display region SD3 and the fourth sub display region SD4 in a plan view. The first slit S1, the second slit S2, and the third slit S3 are simply referred to as the "slits S" when described without distinction. The width of each slit S is, for example, 20 μm.

The first display substrate 11, the second display substrate 12, the first control board 21, and the second control board 22 are made of, for example, glass or resin and have light-transmitting properties. The common electrode CE, the pixel electrodes PE, the first electrode 24, and the second electrode 25 are made of a conductive material such as indium tin oxide (ITO) or indium zinc oxide (IZO) and have light-transmitting properties. The alignment films AL1, AL2, AL3, and AL4 are horizontal alignment films having alignment regulation force parallel to an X-Y plane.

As illustrated in FIG. 2, the display device 1 further includes a seal SE2 that seals liquid crystal molecules in the control liquid crystal layer 23. The control liquid crystal layer 23 has optical rotatory power that rotates the polarization axis of a polarization component of linearly polarized light as described later.

The view angle control panel 20 also includes a third polarization plate 27, a fourth polarization plate 28, and a polarization axis rotation element 29. The third polarization plate 27 is disposed on the back surface side of the first control board 21. The fourth polarization plate 28 is disposed on the front surface side of the second control board 22. The polarization axis rotation element 29 is disposed on the front surface side of the fourth polarization plate 28.

The transmission axis of the third polarization plate 27 and the transmission axis of the fourth polarization plate 28 are each orthogonal to the Z direction. The transmission axis of the third polarization plate 27 and the transmission axis of the fourth polarization plate 28 are orthogonal to each other. The transmission axis of the fourth polarization plate 28 and the transmission axis of the first polarization plate 14 are positioned at mutually different orientations about a Z axis in the Z direction.

The polarization axis rotation element 29 is an optical sheet that rotates the polarization axis of light traveling from the fourth polarization plate 28 toward the display panel 10. Light transmitted through the fourth polarization plate 28 has a polarization axis parallel to the transmission axis of the fourth polarization plate 28. The polarization axis rotation element 29 rotates the polarization axis of the light transmitted through the fourth polarization plate 28 so that the polarization axis aligns with the transmission axis of the first polarization plate 14.

The polarization axis rotation element 29 may be a single optical sheet or may be multilayered optical sheets. The polarization axis rotation element 29 only needs to develop a function to rotate a polarization axis and is not limited to an optical sheet, but may be an element having optical rotatory power, such as a twisted nematic liquid crystal element.

The backlight unit 30 emits light to the display panel 10 through the view angle control panel 20. The backlight unit 30 is of an edge type and includes a light source (not illustrated) and a light guiding plate (not illustrated). The light source is, for example, a light emitting diode (LED) or a fluorescent light. The light guiding plate guides light emitted from the light source so that the light is incident on the view angle control panel 20. The backlight unit 30 may be of a direct type.

The display device 1 does not necessarily need to include the backlight unit 30. In this case, the display device 1 is configured such that the display panel 10 is illuminated with natural light.

In such a display device 1, light (natural light) emitted from the backlight unit 30 passes through the view angle control panel 20 and also the display panel 10, and accordingly, an image is output to the display region DA.

The following describes operation that the view angle control panel 20 adjusts the view angle of the display region DA. The drive system of the view angle control panel 20 is of the TN system as described above, and the liquid crystal molecules contained in the control liquid crystal layer 23 are in twisted alignment.

The following first describes a state in which no voltage is applied to the control liquid crystal layer 23. The long axis of each liquid crystal molecule contained in the control liquid crystal layer 23 is orthogonal to the Z direction in a state in which no voltage is applied to the control liquid crystal layer 23.

Accordingly, the traveling direction of light does not change in the control liquid crystal layer 23. As a result, the transmittance of the control liquid crystal layer 23 is relatively high, substantially uniform, and symmetric across the entire effective region AA. Thus, the view angle of the display region DA is symmetric as well.

However, in a state in which a voltage is applied to the control liquid crystal layer 23, the long axis of each liquid crystal molecule contained in the control liquid crystal layer 23 is not orthogonal to the Z direction but tilts and intersects an X-Y plane.

Accordingly, the traveling direction of light tilts through the control liquid crystal layer 23 in accordance with the tilt of the long axis of each liquid crystal molecule. As a result, the transmittance of the control liquid crystal layer 23 is asymmetric across the effective region AA. Thus, the view angle of the display region DA is asymmetric as well.

In the present embodiment, the transmittance of the control liquid crystal layer 23 is asymmetric in the X direction when a voltage is applied to the control liquid crystal layer 23. Specifically, a negative X side transmittance is lower. The negative X side transmittance is a transmittance of the control liquid crystal layer 23 when the view angle control panel 20 is viewed from the positive Z side and the negative X side (in other words, when the view angle control panel 20 is viewed from the positive Z side in a direction tilted on the negative X side with respect to the reference axis Ax). The negative X side transmittance of the control liquid crystal layer 23 is lower than a positive X side transmittance. The positive X side transmittance is a transmittance of the control liquid crystal layer 23 when the view angle control panel 20 is viewed from the positive Z side and the positive X side (in other words, when the view angle control panel 20 is viewed from the positive Z side in a direction tilted on the positive X side with respect to the reference axis Ax). That is, when the voltage is applied to the control liquid crystal layer 23, the negative X side view angle θ2 in the display region DA decreases and becomes smaller than the positive X side view angle θ1. In other words, the person M1 on the driver seat has difficulty visually recognizing an image.

As the voltage applied to the control liquid crystal layer 23 is larger, the negative X side transmittance decreases and the negative X side view angle θ2 of the display panel 10 decreases. In other words, as the voltage applied to the control liquid crystal layer 23 is larger, the person M1 on the driver seat has more difficulty visually recognizing an image. In this manner, the view angle of the display panel 10 is switched as the voltage applied to the control liquid crystal layer 23 is switched in the view angle control panel 20.

As illustrated in FIG. 2, the display device 1 further includes a first control circuit 40 and a second control circuit 50. The first control circuit 40 is disposed on the first substrate 11. The first control circuit 40 controls the display panel 10 based on a pixel signal transmitted from an external device (not illustrated) and modulates the polarization component of light passing through the display liquid crystal layer 13 so that an image is displayed in the display region DA.

The second control circuit 50 is disposed on the first control board 21. The second control circuit 50 controls the view angle control panel 20 based on a switching signal transmitted from the external device and switches the voltage applied to the control liquid crystal layer 23 so that the view angle of the display panel 10 is switched as described above.

The switching signal includes a visual recognition signal and a non-visual recognition signal. The visual recognition signal is a signal with which the entire image displayed in the display region DA is visually recognized by both the person M1 on the driver seat and the person M2 on the front passenger seat, and the non-visual recognition signal is a signal with which part of the image displayed in the display region DA is not visually recognized by the person M1 on the driver seat but is visually recognized by the person M2 on the front passenger seat. In the present embodiment, the partial image that cannot be visually recognized by the person M1 on the driver seat is an image displayed in the first to third sub display regions SD1, SD2, and SD3.

For example, in a case where one moving image is displayed by using the first to third sub display regions SD1, SD2, and SD3 and not to be visually recognized by the person M1 on the driver seat who is driving, the non-visual recognition signal is transmitted to the second control circuit 50 by turning on a switch (not illustrated) of the external device. For example, a route guidance image is displayed in the fourth sub display region SD4 and can be visually recognized by the person M1 on the driver seat even when the non-visual recognition signal is transmitted to the second control circuit 50.

When having received the visual recognition signal, the second control circuit 50 does not generate potential difference between the first electrode 24 and the second electrode 25 of the view angle control panel 20. Accordingly, no voltage is applied to the control liquid crystal layer 23, and the transmittance of the control liquid crystal layer 23 is relatively high, substantially uniform, and symmetric across the entire effective region AA as described above. Thus, the view angle of the display panel 10 is symmetric with a relatively large angle range, and the entire image displayed in the display region DA can be visually recognized by both the person M1 on the driver seat and the person M2 on the front passenger seat.

When having received the non-visual recognition signal, the second control circuit 50 adjusts the view angle for each of the first sub display region SD1 corresponding to the first divided electrode 26a, the second sub display region SD2 corresponding to the second divided electrode 26b, the third sub display region SD3 corresponding to the third divided electrode 26c, and the fourth sub display region SD4 corresponding to the fourth divided electrode 26d.

Specifically, when having received the non-visual recognition signal, the second control circuit 50 does not generate potential difference between the first electrode 24 and the fourth divided electrode 26d of the view angle control panel 20. Specifically, the potential of the fourth divided electrode 26d is equal to the potential of the first electrode 24. Accordingly, no voltage is applied to the control liquid crystal layer 23 between the fourth divided electrode 26d and the first electrode 24, and the transmittance of the control liquid crystal layer 23 is relatively high, substantially uniform, and symmetric across the entire fourth sub effective region SA4 corresponding to the fourth divided electrode 26d.

Thus, the view angle of the display panel 10 is relatively high and symmetric across the fourth sub display region SD4 corresponding to the fourth sub effective region SA4, and an image displayed in the fourth sub display region SD4 can be visually recognize by both the person M1 on the driver seat and the person M2 on the front passenger seat.

When having received the non-visual recognition signal, the second control circuit 50 generates potential difference between the first electrode 24 and each of the first to third divided electrodes 26a, 26b, and 26c of the view angle control panel 20. Specifically, the potential of each of the first to third divided electrodes 26a, 26b, and 26c becomes higher than the potential of the fourth divided electrode 26d. Accordingly, a voltage is applied between the first electrode 24 and each of the first to third divided electrodes 26a, 26b, and 26c, and the negative X side transmittance decreases in each of the first to third sub effective regions SA1, Sa2, SA3 corresponding to the first to third divided electrodes 26a, 26b, and 26c. Thus, when the non-visual recognition signal is received by the second control circuit 50, the negative X side view angle θ2 decreases and becomes smaller than the positive X side view angle θ1 in each of the first to third sub display regions SD1, SD2, and SD3.

In addition, the second control circuit 50 sets potential difference to be larger in the order of the potential difference between the first electrode 24 and the third divided electrode 26c, the potential difference between the first electrode 24 and the second divided electrode 26b, and the potential difference between the first electrode 24 and the first divided electrode 26a. Specifically, the second control circuit 50 sets potential to be higher in the order of the potential of the third divided electrode 26c, the potential of the second divided electrode 26b, and the potential of the first divided electrode 26a. In other words, of two divided electrodes 26 adjacent to each other among the first to third divided electrodes 26a, 26b, and 26c, the potential of the divided electrode 26 on the negative X side in the X direction is higher than the potential of the divided electrode 26 on the positive X side in the X direction.

Figure 5:
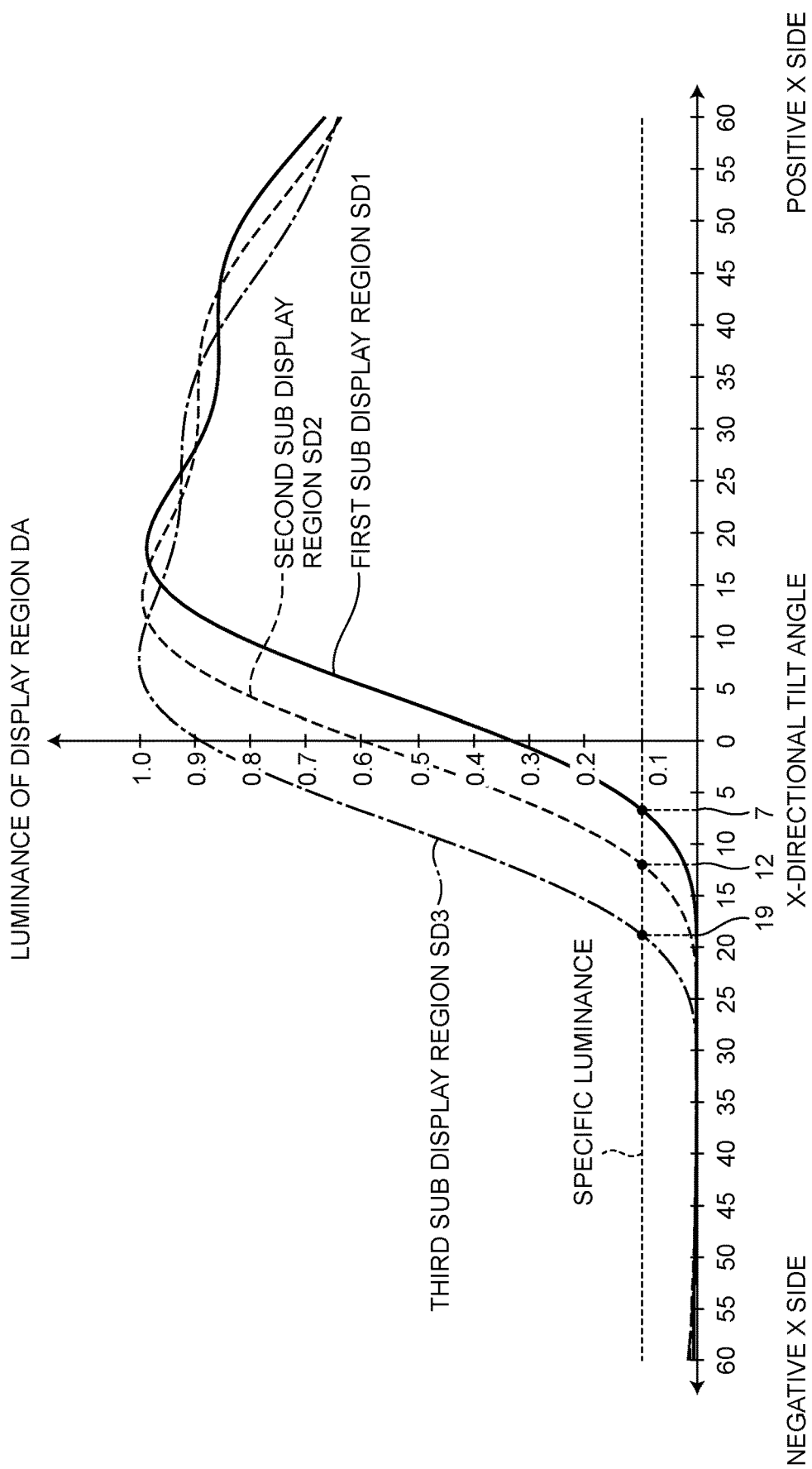
FIG. 5 is a graph illustrating a relation between luminance of a display region for each divided electrode and an X-directional tilt angle in a case where a control circuit controls the view angle control panel based on a non-visual recognition signal when the display region is entirely displayed in white, the tilt angle indicating a tilt along a direction tilted to either side in an X direction with respect to a reference axis when the display region is viewed from a positive Z side.

FIG. 5 is a graph illustrating a relation between the luminance of the display region DA for each divided electrode 26 and the X-directional tilt angle in a case where the second control circuit 50 controls the view angle control panel 20 based on the non-visual recognition signal when the display region DA is entirely displayed in white, the X-directional tilt angle indicating a tilt along a direction tilted to either side in the X direction with respect to the reference axis Ax when the display region DA is viewed from the positive Z side. In FIG. 5, the X-directional tilt angle on the positive X side is the angle of a tilt on the positive X side with respect to the reference axis Ax, and the X-directional tilt angle on the negative X side is the angle of a tilt on the negative X side in the X direction with respect to the reference axis Ax.

The maximum value of the luminance of the display region DA is set as "1" in a case where the second control circuit 50 controls the view angle control panel 20 based on the visual recognition signal when the display region DA is entirely displayed in white. When the luminance of the display region DA is equal to or higher than a predetermined specific luminance, an image displayed in the display region DA can be visually recognized by the person M1 on the driver seat and the person M2 on the front passenger seat. The specific luminance is derived by experiment or the like in advance and is, for example, 0.1. Thus, the X-directional tilt angle corresponding to the luminance of the display region DA that is equal to or higher than the specific luminance corresponds to the view angle.

In a case where the second control circuit 50 controls the view angle control panel 20 based on the non-visual recognition signal when the display region DA is entirely displayed in white, the potentials are set to be higher in the order of the potential of the third divided electrode 26c, the potential of the second divided electrode 26b, and the potential of the first divided electrode 26a as described above. Accordingly, the negative X side transmittance becomes lower in the order of the third sub effective region SA3 corresponding to the third divided electrode 26c, the second sub effective region SA2 corresponding to the second divided electrode 26b, and the first sub effective region SA1 corresponding to the first divided electrode 26a.

The luminance of the display region DA is lower as the transmittance is lower. Thus, in the tilt angle region on the negative X side in FIG. 5, when the negative X side transmittance becomes low, the luminance of the third sub display region SD3 corresponding to the third sub effective region SA3, the luminance of the second sub display region SD2 corresponding to the second sub effective region SA2, and the luminance of the first sub display region SD1 corresponding to the first sub effective region SA1 become lower in the stated order. Accordingly, the negative X side view angle θ2 becomes smaller in the order of the third sub display region SD3, the second sub display region SD2, and the first sub display region SD1.

As described above, the X-directional tilt angle corresponding to the luminance of the display region DA that is equal to or higher than the specific luminance (=0.1) corresponds to the view angle. Specifically, the negative X side view angle θ2 of the third sub display region SD3 is approximately 19°, the negative X side view angle θ2 of the second sub display region SD2 is approximately 12°, and the negative X side view angle θ2 of the first sub display region SD1 is approximately 7°.

Thus, the person M1 on the driver seat positioned on the negative X side of the display device 1 has more difficulty visually recognizing an image in the order of the third sub display region SD3, the second sub display region SD2, and the first sub display region SD1 and cannot visually recognize images displayed in the three sub display regions SD1, SD2, and SD3.

For example, in a case where the display region DA is relatively long in the X direction and relatively close to the person M1 on the driver seat, an image displayed in the first sub display region SD1, which is closest to the person M1 on the driver seat, can potentially be visually recognized by the person M1 on the driver seat. However, since the negative X side view angle θ2 is set to be smaller in the order of the third sub display region SD3, the second sub display region SD2, and the first sub display region SD1 as described above, images displayed in the three sub display regions SD1, SD2, and SD3 can be less visible to the person M1 on the driver seat even in a case where the display region DA is relatively long in the X direction.

The luminance of the display region DA on the positive X side of the third sub display region SD3, the second sub display region SD2, and the first sub display region SD1 is equal to or higher than "0.1" for the tilt angle of 0 to 80°. Accordingly, the positive X side view angle θ1 of each of the three sub display regions SD1, SD2, and SD3 is equal to or larger than 80°, and images displayed in the three sub display regions SD1, SD2, and SD3 can be visually recognized by the person M2 on the front passenger seat positioned in front of the display device 1.

When the negative X side view angle θ2 of the display region DA is relatively small, an image displayed in any one of the three sub display regions SD1, SD2, and SD3 cannot potentially be visually recognized by the person M2 on the front passenger seat, depending on the positional relation between the display region DA and the person M2 on the front passenger seat. However, as described above, the third sub display region SD3, the second sub display region SD2, and the first sub display region SD1 are arranged in the stated order from the positive X side to the negative X side, and the negative X side view angle θ2 is smaller in the order of the third sub display region SD3, the second sub display region SD2, and the first sub display region SD1. Thus, images displayed in the three sub display regions SD1, SD2, and SD3 can be visually recognized by the person M2 on the front passenger seat positioned in front of the display device 1.

In a case where the second control circuit 50 controls the view angle control panel 20 based on the visual recognition signal when the display region DA is entirely displayed in white, the luminance of the display region DA is equal to or higher than "0.1" for the negative X side tilt angle of 80° or smaller and the positive X side tilt angle of 80° or smaller. In other words, the negative X side view angle θ2 and the positive X side view angle θ1 of the display region DA are equal to or larger than 80°. Accordingly, the view angle of the display region DA in the X direction is equal to or larger than 160°, and an image displayed in the display region DA can be visually recognized by the person M1 on the driver seat and the person M2 on the front passenger seat.

In this manner, the view angle control panel 20 and the display device 1 can appropriately control the view angle of the display region DA as the second control circuit 50 controls the potential of each divided electrode 26 based on the visual recognition signal and the non-visual recognition signal.

Modification of First Embodiment

Figure 6:
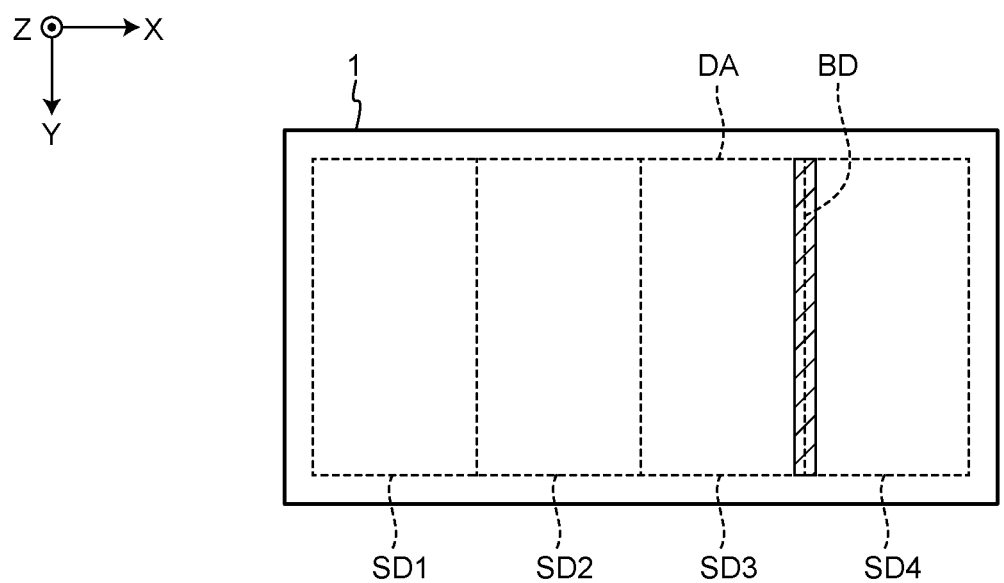
FIG. 6 is a plan view of the display device according to a modification of the first embodiment.

The following describes the display device 1 according to a modification of the first embodiment. FIG. 6 is a plan view of the display device 1 according to the modification of the first embodiment.

The display region DA according to the present modification includes a black display region BD. The black display region BD is a region in the display region DA in which black is displayed. The black display region BD has a strip shape parallel to a slit S in a plan view. The width of the black display region BD is equal to the width of the slit S. The black display region BD overlaps the boundary line between the third sub display region SD3 and the fourth sub display region SD4 and also overlaps the third slit S3 in a plan view. Specifically, the X-directional ends of the black display region BD substantially match the respective X-directional ends of the third slit S3 in a plan view.

This configuration makes it difficult for the person M1 to perceive the light of the backlight unit 30 that leaks from the third slit S3. Thus, when an image in the third sub display region SD3 cannot be visually recognized by the person M1 on the driver seat due to the non-visual recognition signal as described above, light leaking from the third slit S3 can be made less visible to the person M1 on the driver seat positioned on the negative X side of the display device 1.

The black display region BD may overlap any one of the slits S. Alternatively, a plurality of black display regions BD may be provided and overlap the slits S.

The width of the black display region BD may be larger than the width of the third slit S3, and the end of the black display region BD on the negative X side may be positioned on the negative X side of the end of the third slit S3 on the negative X side in a plan view. In this case, the end of the black display region BD on the positive X side may be positioned between the ends of the third slit S3 in a plan view.

The black display region BD may be positioned on the negative X side of the third slit S3 in the X direction in a plan view. In this case, the X-directional ends of the black display region BD are positioned on the negative X side of the third slit S3 in the X direction. Accordingly, the black display region BD is positioned near the third slit S3 on the negative X side of the third slit S3 in the X direction in a plan view, in other words, between the second slit S2 and the third slit S3, and thus light leaking from the third slit S3 can be further made less visible to the person M1 on the driver seat.

The black display region BD may be positioned on the negative X side of the first slit S1 in the X direction in a plan view or may be positioned on the negative X side of the second slit S2 in the X direction in a plan view.

Second Embodiment

The following describes the display device 1 according to a second embodiment and especially describes difference from the above-described display device 1 according to the first embodiment. The display device 1 according to the second embodiment includes, in place of the view angle control panel 20 according to the first embodiment, an electro-optical unit 150 including two electro-optical devices.

Figure 7:
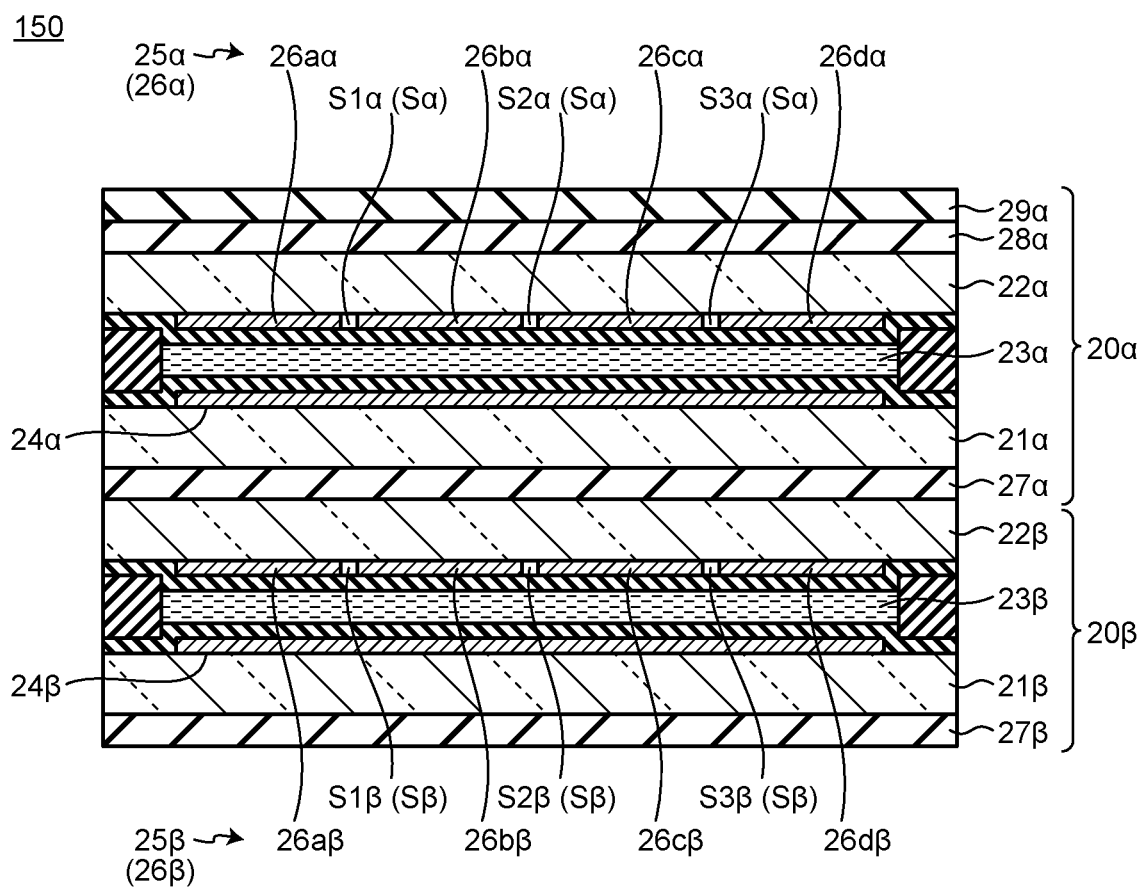
FIG. 7 is a sectional view of an electro-optical unit of the display device according to a second embodiment.

FIG. 7 is a sectional view of the electro-optical unit 150 of the display device 1 according to the second embodiment. The configuration of a first view angle control panel 20α as one of the electro-optical devices included in the electro-optical unit 150 is the same as the configuration of the above-described view angle control panel 20 according to the first embodiment.

A second view angle control panel 20β as the other electro-optical device included in the electro-optical unit 150 is bonded onto the back surface side of the first view angle control panel 20α. The configuration of the second view angle control panel 20β is the same as the configuration of the view angle control panel 20 according to the first embodiment except that the second view angle control panel 20β includes no polarization plate corresponding to the fourth polarization plate 28 nor element corresponding to the polarization axis rotation element 29, which are included in the view angle control panel 20 according to the first embodiment.

Hereinafter, the name of each component of the first view angle control panel 20α is a name obtained by adding "first" to the name of the corresponding component of the above-described view angle control panel 20 according to the first embodiment, and the reference sign thereof is a reference sign obtained by adding "α" to the reference sign of the component of the above-described view angle control panel 20 according to the first embodiment. In addition, the name of each component of the second view angle control panel 20β is a name obtained by adding "second" to the name of the corresponding component of the above-described view angle control panel 20 according to the first embodiment, and the reference sign thereof is a reference sign obtained by adding "β" to the reference sign of the component of the above-described view angle control panel 20 according to the first embodiment.

Specifically, the first view angle control panel 20α includes a first first control board 21α, a first second control board 22α, a first control liquid crystal layer 23α, a first first electrode 24α, a first second electrode 25α, a first third polarization plate 27α, a first fourth polarization plate 28α, and a polarization axis rotation element 29α.

The first second electrode 25α is partitioned into a plurality of first divided electrodes 26α. The first divided electrodes 26α include a first first divided electrode 26aα, a first second divided electrode 26bα adjacent to the first first divided electrode 26aα with a first first slit S1α interposed therebetween, a first third divided electrode 26cα adjacent to the first second divided electrode 26bα with a first second slit S2α interposed therebetween, and a first fourth divided electrode 26dα adjacent to the first third divided electrode 26cα with a first third slit S3α interposed therebetween. The first first slit S1α, the first second slit S2α, and the first third slit S3α constitute a first slit Sα.

The second view angle control panel 20β includes a second first control board 21β, a second second control board 22β, a second control liquid crystal layer 23β, a second first electrode 24β, a second second electrode 25β, and a second third polarization plate 27β. The second second control board 22β is bonded onto the back surface of the first third polarization plate 27α. The transmission axis of the first third polarization plate 27α is orthogonal to the transmission axis of the second third polarization plate 27β.

The second second electrode 25β is partitioned into a plurality of second divided electrodes 26β. The second divided electrodes 26β include a second first divided electrode 26aβ, a second second divided electrode 26bβ adjacent to the second first divided electrode 26aβ with a second first slit S1β interposed therebetween, a second third divided electrode 26cβ adjacent to the second second divided electrode 26bβ with a second second slit S2β interposed therebetween, and a second fourth divided electrode 26dβ adjacent to the second third divided electrode 26cβ with a second third slit S3β interposed therebetween. The second first slit S1β, the second second slit S2β, and the second third slit S3β constitute a second slit Sβ.

The first first divided electrode 26aα overlaps the second first divided electrode 26aβ in a plan view, and the first second divided electrode 26bα overlaps the second second divided electrode 26bβ in a plan view. The first third divided electrode 26cα overlaps the second third divided electrode 26cβ in a plan view, and the first fourth divided electrode 26dα overlaps the second fourth divided electrode 26dβ in a plan view.

Figure 8:
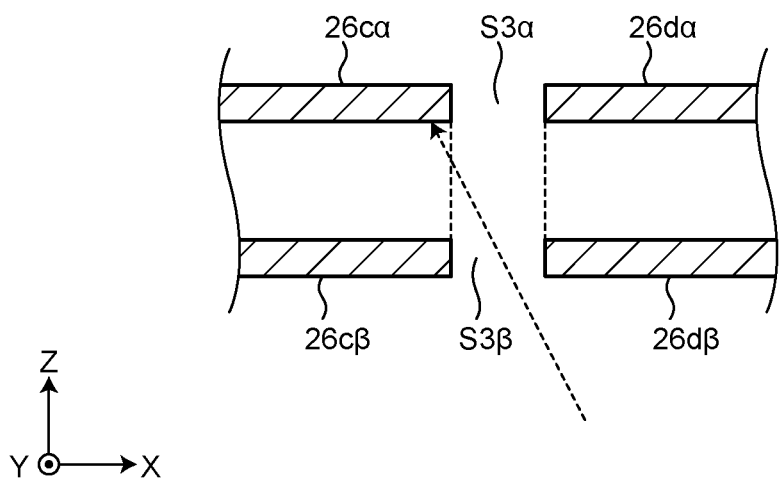
FIG. 8 is a sectional view schematically illustrating a first slit of a first view angle control panel and a second slit of a second view angle control panel according to the second embodiment.

FIG. 8 is a sectional view schematically illustrating the first slit Sα of the first view angle control panel 20α and the second slit Sβ of the second view angle control panel 20β according to the second embodiment. FIG. 8 illustrates the first third slit S3α and the second third slit S3β.

As illustrated in FIG. 8, the first third slit S3α and the second third slit S3β overlap each other in a plan view. Specifically, the X-directional ends of the first third slit S3α substantially match the respective X-directional ends of the second third slit S3β in a plan view. Accordingly, light (dashed line arrow in FIG. 8) leaking to the negative X side from the second third slit S3β passes through the first control liquid crystal layer 23α between the first third divided electrode 26cα and the first first electrode 24α. Thus, when an image in third sub display region SD3 cannot be visually recognized by the person M1 on driver seat due to the non-visual recognition signal as described above, light (dashed line arrow in FIG. 8) leaking from the second third slit S3β can be made less visible to the person M1 on driver seat positioned on the negative X side of the display device 1.

The first first slit S1α and the second first slit S1β may overlap each other in a plan view, and the first second slit S2α and the second second slit S2β may overlap in a plan view.

The width of the second third slit S3β may be different from the width of the first third slit S3α, and the end of the second third slit S3β on the positive X side in the X direction may be positioned between the X-directional ends of the first third slit S3α in a plan view. Moreover, the end of the second third slit S3β on the positive X side in the X direction does not necessarily need to overlap the end of the first third slit S3α on the negative X side in the X direction in a plan view. This is the same for the relation between the first first slit S1α and the second first slit S1β and the relation between the first second slit S2α and the second second slit S2β.

Figure 9:
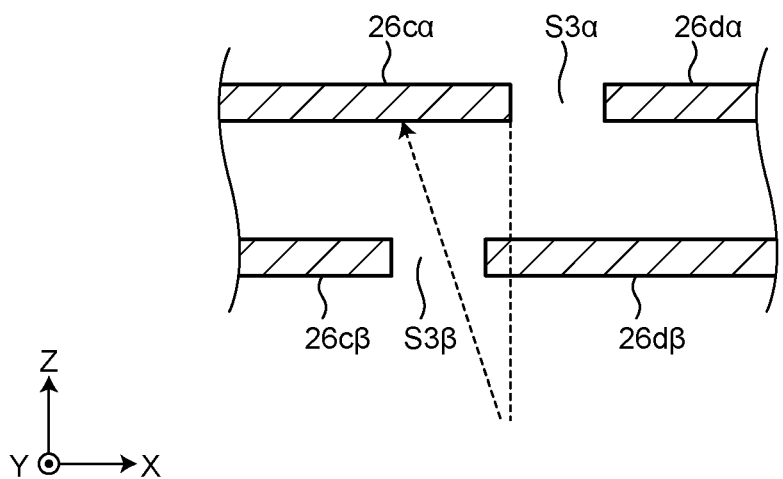
FIG. 9 is a sectional view schematically illustrating the first slit of the first view angle control panel and the second slit of the second view angle control panel according to a modification of the second embodiment.

FIG. 9 is a sectional view schematically illustrating the first slit Sα of the first view angle control panel 20α and the second slit Sβ of the second view angle control panel 20β according to a modification of the second embodiment. FIG. 9 illustrates the first third slit S3α and the second third slit S3β.

As illustrated in FIG. 9, the second third slit S3β is positioned on the negative X side of the first third slit S3α in the X direction in a plan view. In this case, the X-directional ends of the second third slit S3β are positioned on the negative X side of the X-directional ends of the first third slit S3α in the X direction. Accordingly, when an image in third sub display region SD3 cannot be visually recognized by the person M1 on driver seat due to the non-visual recognition signal as described above, the electro-optical unit 150 and the display device 1 can further make light (dashed line arrow in FIG. 9) leaking from the second third slit S3β less visible to the person M1 on driver seat positioned on the negative X side of the display device 1.

The electro-optical unit 150 includes the two view angle control panels 20α and 20β and thus can appropriately control the view angle of display region DA, similarly to the view angle control panel 20 according to first embodiment.

The second first slit S1β may be positioned on the negative X side of the first first slit S1α in the X direction in a plan view, and the second second slit S2β may be positioned on the negative X side of the first second slit S2α in the X direction in a plan view.

Other Modifications

Preferable embodiments of the present invention are described above, but the present invention is not limited to such embodiments. Contents disclosed in the embodiments are merely exemplary, and various kinds of modifications are possible without departing from the scope of the present invention. Any modification performed as appropriate without departing from the scope of the present invention belongs to the technical scope of the present invention. At least one of various kinds of omission, replacement, and modification of any constituent component may be performed without departing from the scope of the above-described embodiments and modifications.

For example, when having received the non-visual recognition signal, the second control circuit 50 sets the potential of the fourth divided electrode 26d to be higher than the potential of the first electrode 24 and lower than the potential of the third divided electrode 26c. In this case, the display device 1 can make an image displayed in the fourth sub display region SD4 less visible to the person M1 on driver seat.

Alternatively, when having received the non-visual recognition signal, the second control circuit 50 may set at least any one of the first to third divided electrodes 26a, 26b, and 26c to be equal to the potential of the first electrode 24. In this case, the display device 1 can allow images displayed in the sub display regions SD corresponding to the at least any one of the first to third divided electrodes 26a, 26b, and 26c equipotential to the first electrode 24 to be visually recognized by the person M1 on driver seat.

The positive X side transmittance of the control liquid crystal layer 23 may be decreased when a voltage is applied to the control liquid crystal layer 23. In this case, the positive X side transmittance of each of the sub display regions SD may be decreased, and in addition, of two divided electrodes 26 adjacent to each other, the potential of the divided electrode 26 on the positive X side in X direction may be higher than the potential of the divided electrode 26 on the negative X side in X direction. Accordingly, the positive X side view angle θ1 of each of the sub display regions SD is smaller than the negative X side view angle θ2 thereof.

The view angle control panel 20 may control the view angle in a direction intersecting the X direction.

The transmittance of the first view angle control panel 20α and the transmittance of the second view angle control panel 20β may have asymmetry in directions different from each other when a voltage is applied to each of the first control liquid crystal layer 23α and the second control liquid crystal layer 23β.

It should be understood that the present disclosure provides any other effects achieved by aspects described above in the present embodiment, such as effects that are clear from the description of the present specification or effects that could be thought of by the skilled person in the art as appropriate.

The view angle control panel 20 corresponds to an example of an "electro-optical device", the first view angle control panel 20α corresponds to an example of a "first electro-optical device", and the second view angle control panel 20β corresponds to an example of a "second electro-optical device". The first control board 21 corresponds to an example of a "first substrate", the second control board 22 corresponds to an example of a "second substrate", and the control liquid crystal layer 23 corresponds to an example of a "liquid crystal layer".

What is claimed is:

1. An electro-optical device configured to be placed so as to overlap a display panel configured to display an image in a display region provided with a plurality of pixel electrodes, the electro-optical device comprising:
   a first substrate;
   a first electrode disposed on the first substrate;
   a second substrate disposed facing the first substrate;
   a second electrode disposed on the second substrate and facing the first electrode; and
   a liquid crystal layer provided between the first electrode and the second electrode, wherein
   the second electrode includes a plurality of divided electrodes arranged in a first direction and each of which has a size in the first direction larger than each of the pixel electrodes, two divided electrodes adjacent to each other among the divided electrodes are disposed with a slit interposed between the two divided electrodes, each of the divided electrodes is configured to adjust a view angle of the display region in accordance with a visual recognition control signal related to visual recognition of the image displayed in the display region, and the electro-optical device is placed between the display panel and a viewer.

2. The electro-optical device according to claim 1, wherein, of the two divided electrodes adjacent to each other, a potential of a divided electrode on a first side in the first direction is higher than a potential of a divided electrode on a second side in the first direction.

3. The electro-optical device according to claim 1, wherein
a potential of one of the divided electrodes is equal to a potential of the first electrode, and
a potential of another one of the divided electrodes is higher than the potential of the one divided electrode.

4. An electro-optical unit comprising two of the electro-optical devices according to claim 1, wherein
two first divided electrodes adjacent to each other among a plurality of first divided electrodes included in a first electro-optical device of the two electro-optical devices are disposed with a first slit interposed between the two first divided electrodes,
two second divided electrodes adjacent to each other among a plurality of second divided electrodes included in a second electro-optical device of the two electro-optical devices overlap the two first divided electrodes in a plan view and are disposed with a second slit interposed between the two second divided electrodes, and
the second slit overlaps the first slit in a plan view.

5. An electro-optical unit comprising two of the electro-optical devices according to claim 1, wherein
two first divided electrodes adjacent to each other among a plurality of first divided electrodes included in a first electro-optical device of the two electro-optical devices are disposed with a first slit interposed between the two first divided electrodes,
two second divided electrodes adjacent to each other among a plurality of second divided electrodes included in a second electro-optical device of the two electro-optical devices overlap the two first divided electrodes in a plan view and are disposed with a second slit interposed between the two second divided electrodes,
the second electro-optical device is disposed on a back surface side of the first electro-optical device, and
the second slit is positioned on a first side of the first slit in the first direction in a plan view.

6. A display device comprising:
the electro-optical device according to claim 1; and
the display panel having the display region, wherein
the electro-optical device entirely overlaps the display region in a plan view.

7. The display device according to claim 6, wherein
the display region includes a strip-shaped black display region parallel to the slit in a plan view, and
the black display region overlaps the slit in a plan view.

8. The display device according to claim 6, wherein
the display region includes a strip-shaped black display region parallel to the slit in a plan view, and
the black display region is positioned on a first side of the slit in the first direction in a plan view.

9. The electro-optical device according to claim 1, wherein
when the visual recognition control signal is a first signal, potentials of the divided electrodes are controlled such that a traveling direction of light does not change in the liquid crystal layer, and
when the visual recognition control signal is a second signal, the potentials of the divided electrodes are controlled such that a transmittance of the liquid crystal layer decreases from one side to the other side in the first direction.

* * * * *